Figure 4:
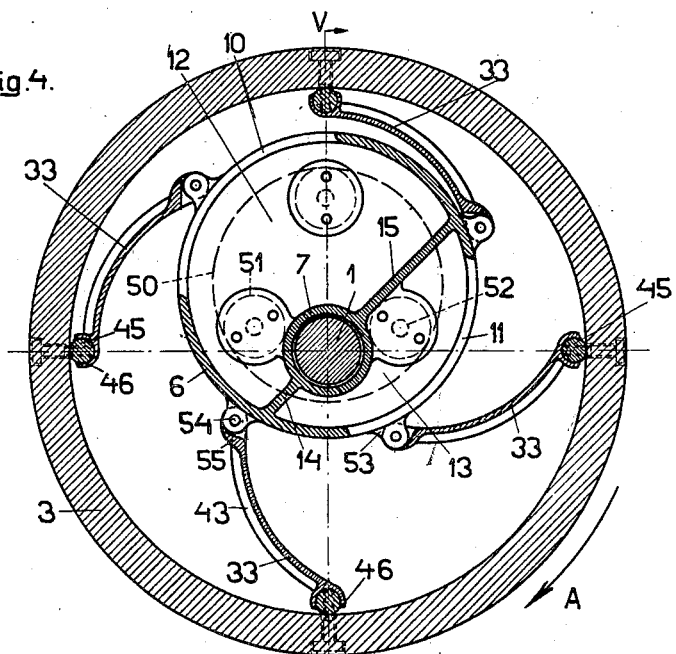

Nov. 1, 1932.  E. MANDLER  1,886,206
ROTARY BLOWER
Filed Aug. 26, 1930  2 Sheets-Sheet 1
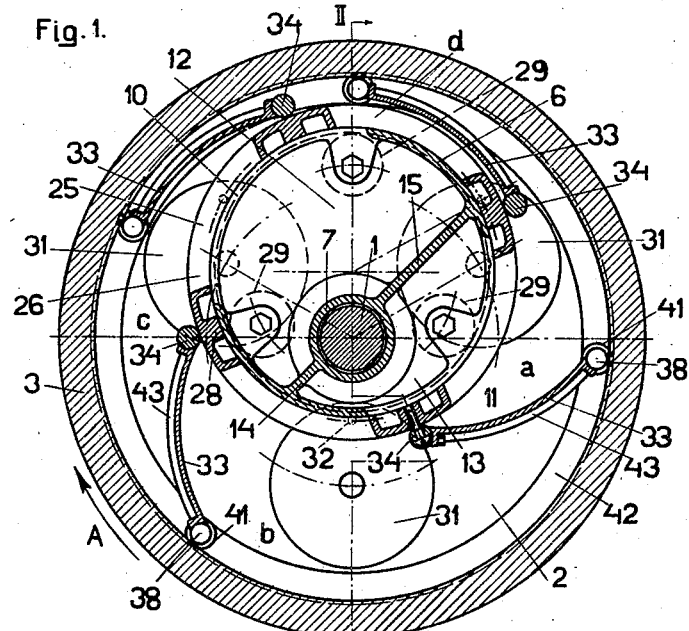
E. Mandler
INVENTOR Nov. 1, 1932.  E. MANDLER  1,886,206

ROTARY BLOWER

Filed Aug. 26, 1930  2 Sheets-Sheet 2

E. Mandler
INVENTOR

By Marks & Clerk
ATTYS

Patented Nov. 1, 1932

1,886,206

UNITED STATES PATENT OFFICE

EUGEN MANDLER, OF VIENNA, AUSTRIA, ASSIGNOR TO THE FIRM CLIMAX MOTORENWERKE UND SCHIFFSWERFT LINZ A. G., OF VIENNA, AUSTRIA

ROTARY BLOWER

Application filed August 26, 1930, Serial No. 477,954, and in Austria August 30, 1929.

This invention relates to improvements in rotary blowers of the type comprising a casing rotating around a non-rotatable drum disposed eccentrically within the same, and oscillating blades dividing the space between the drum and the casing into several expansible and contractible chambers. The object of the invention is to provide a construction adapted to be used particularly as a charging and/or scavenging pump for internal combustion engines and at the same time as a fly-wheel.

For this purpose the rotary casing is constructed so as to form a gyrating body. As it is thus the largest and heaviest part of the blower which forms the fly-wheel rim the normal dimensions of the inner parts are not altered, so that such a blower-fly-wheel is only insignificantly heavier than an equivalent ordinary fly-wheel. Power can be taken from the periphery of the casing without any difficulty.

As a further feature of the invention the air inlets and outlets are arranged on the side towards the engine substantially at right angles to the axis of rotation. Thus the pressure duct leading to the cylinder is exceedingly short, it becomes possible to derive a part of the air sucked in by the blower from the crank case, and the transmission of power from the periphery of the fly-wheel is not hindered by pipes or the like, and that without the total length of the blower requiring to be increased appreciably. In particular the air is let into and out from the blower through the interior of the drum upon a projection of which two sockets are fitted radially.

The invention may be carried into practice in connection either with blowers having the blades articulated to the casing with their outer ends and sliding upon the drum with their inner ends or with blowers having the blades connected with their inner ends to a ring or the like surrounding the drum and sliding upon the inner surface of the casing with their outer ends. According to a preferred structure of the first kind the blades are hingedly connected with their inner ends to a set of rings disposed between a wall of the casing and a wall of the drum. Thus the air is not hindered to pass from the interior of the drum into the chambers formed by the blades and vice versa.

A structure of the other kind comprises a control ring which is rotating around the fixed eccentrical drum and the movement of which is derived from the rotating casing. The blades are hingedly mounted in the control ring and slide with their outer ends upon the inner surface of the casing. This arrangement is characterized by high output in relation to the external dimensions, thus enabling the length of the blower to be further reduced. The control ring is most preferably driven in a manner to rotate with uniform velocity, thus becoming enabled to be made very heavy so as to promote the fly-wheel effect of the casing. The control ring may be driven for instance by parallelogram links pivoted in the casing. The blades are positively guided at their outer ends, so that they slide upon the inner surface of the casing even at a small number of revolutions, as long as centrifugal force is not sufficient to press the blades against the casing. Thus the blower supplies a sufficient quantity of air even during the starting up of the engine.

Since, while the blower is working, the lubricating oil is flung outwards from the middle parts of the blower new lubricating oil has to be supplied constantly to the lubricating points near the axis, whereas at the outer parts an excess of oil accumulates. The greater this excess the more the compressed air will be saturated with oil. This however is not desirable in most cases, particularly in the case of internal combustion engines, because of the formation of soot in the cylinders. According to the invention this inconvenience is obviated by fitting the drum by means of ball bearings upon the driving axle and by making the control ring not rotate immediately upon the drum but upon a set of ball bearings secured to the side walls of the drum.

A small amount of lubrication, sufficient however for the ball bearings, may be obtained by taking as already mentioned a part of the air sucked in by the blower out of the crank case, the air in which is always saturated with oil. In this manner the crank case is at the same time ventilated.

In the drawings two preferred embodiments of the invention, blowers mounted like an overhung fly-wheel upon the crank shaft of an internal combustion engine, are shown by way of example.

In Figs. 1–3 there is shown a blower of the kind having the blades connected to a control ring. In particular Fig. 1 is a cross-section taken on the line I—I of Fig. 2; Fig. 2 a longitudinal section taken on the line II—II of Fig. 1; Fig. 3 a cross-section taken on the line III—III of Fig. 2.

Figure 5:
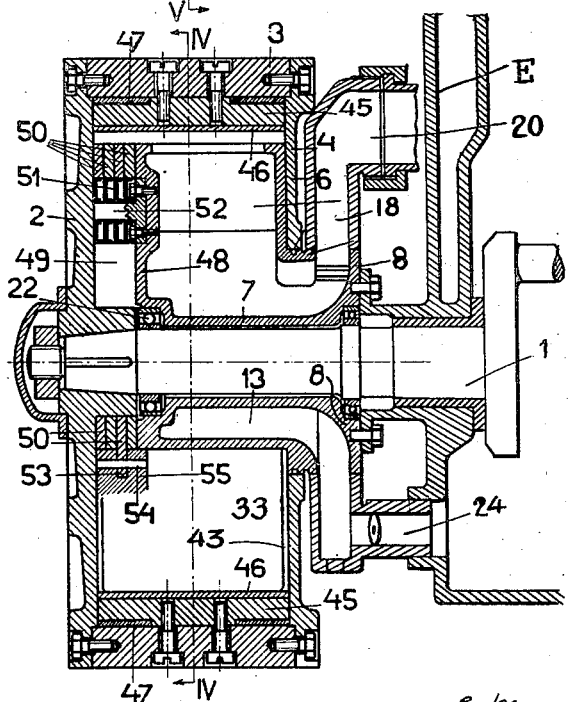

Figs. 4 and 5 show a blower with the blades being secured to a set of rings, Fig. 4 being a cross-section taken on the line IV—IV of Fig. 5 and Fig. 5 a longitudinal section taken on the line V—V of Fig. 4.

Referring to Figs. 1–3 a plate 2 is keyed upon the crank shaft 1 of an internal combustion engine E indicated in Fig. 2 by parts of its cooling jacket and crank case. The rim 3 adapted to serve as a fly-wheel is detachably secured to the plate 2. The rim 3 may be provided with a camber or with grooves, according as to whether the power is to be transmitted by a belt or by ropes. A second plate 4 having a central opening 5 is detachably secured to the rim 3. The parts 2, 3 and 4 form the rotary casing of the blower. The fixed drum takes the form of a hollow cylinder 6 made in one piece with a tube 7 arranged eccentrically within the hollow cylinder. The tube 7 is fitted upon the shaft 1 and terminates towards the main bearing in a flange 8 secured to the engine E, the outside diameter of this flange being equal to the diameter of the opening 5. The cylindrical drum 6 terminates in a short hollow cylinder 9 passing through and fitting into the central opening 5.

Upon its peripheral face the drum 6 is provided with an outlet slot 10 and an inlet slot 11 leading to a large compression chamber 12 and to a smaller suction chamber 13 respectively into which chambers the interior of the drum is divided by the separating wall 14, 15.

The partition 14, 15 continues up to the flange 8 and is provided with ekings 16, 17 turned in one with the flange 8 and the cylinder 9. Two sockets, a pressure socket 18 and an inlet socket 19, are fitted radially upon the part of the cylinder 9 projecting out of the casing and upon the periphery of the flange 8, and rigidly clamped thereupon by being screwed together, the plane of division between the two sockets coinciding with the partition 14, 15. The cylindrical ekings serve for the packing of the sockets, where they are joined together. Since the internal diameter of the sockets taken in rectangular direction to the axis is large their axial length can be reduced to a minimum.

The pressure socket 18 is joined to the pressure duct leading to the cylinders by means of its upper rectangularly bent part 20. It will be clear that the pressure prevailing in the outlet opening as well as the back pressure of the discharge air give rise to an axial thrust upon the drum which has to be taken up by the ball bearings 21, 22, by means of which the drum is mounted upon the crank shaft.

The inlet socket 19 is provided with a long narrow slot 23 communicating with the outside atmosphere and embodying a filter and with a short socket provided with a throttle valve 24, the socket being connected with the inside of the crank case. According to the position of the throttle valve the in-take to the blower is derived to a greater or less extent from the crank case.

The control ring 25 comprises two lateral heavily constructed runners 26, 27 connected by bridges 28, these being the distributing members proper. The control ring does not rotate directly upon the hollow cylinder 6, on the contrary the runners 26, 27 are borne by a set, at least three to each ring, of small ball bearings 29, 30 secured to the walls of the drum, any sliding friction between the control ring and the drum being thus eliminated.

Three revolving plates 31—there could be provided more—are arranged in the casing wall 2 at equal distances from the axis. These plates are pivotally connected with the runner ring 26 of the control ring 25 by means of bolts 32, the eccentricity of the bolts with regard to the centers of the plates 31 being equal and parallel to the eccentricity of the hollow cylinder 6 and of the control ring 25 in regard to the axis. Thus the angular velocity of the control ring is always equal to that of the casing 2, 3, 4.

The blades 33 are pivotally secured to the control ring by means of bolts 34 which are screwed to the bridges 28 in the middle and are fitted with revolving tubes 35 at their reduced ends, which tubes are screwed together with strengthening pieces 36 at the inner ends of the blades 33.

Similar strengthening pieces 37 are provided at the outer ends of the blades 33, tubes 38 the length of which is equal to the breadth of the blades being screwed to these pieces. These tubes 38 slide with their outer surface along the inside of the rim, thus making a very good joint between the chambers formed by the blades without increasing the losses due to friction, since the lubrication of the outer parts is always sufficient, as already mentioned, and since furthermore the relative motion between the inside of the rim and the ends of the blades is very slight.

At the ends remotest from the engine, pistons 39 are secured within the tubes 38 and provided with pins 40, upon which revolving rollers 41 are fitted. These rollers run with a slight clearance in a concentric groove 42 in the casing wall 2. At low speeds of revolution the centrifugal force having not yet overcome the counterpressure the rollers 41 run upon the inner, at higher speeds of revolution upon the outer circular path.

The blades 33 are provided with upwardly bent edges 43, making the blades more resistant and effecting a perfect joint between the blades and the case wall.

The space between drum and casing is divided by the four blades 33 into four parts $a$—$d$. With the direction of rotation indicated by the arrow A and with a position of the parts as shown in Fig. 1 the chamber $a$ sucks in air from the inlet chamber 13. Further rotation causes the volume of the chamber $a$ to increase until the chamber $a$ assumes the position occupied by chamber $b$. The inlet period is then finished, the volume of the chamber $a$ diminishes, the air is compressed and while the chamber $a$ is in the position $c$ and $d$ is pressed into the pressure duct through the chamber 12 and the socket 18.

Lubricating oil is supplied from the casing wall 2. The casing wall 4 is lubricated by one or more oil ducts 44 leading from the casing wall 2 through the rim 3 to the casing wall 4. In the casing wall 2 the ducts 44 are opening nearer to the axis than in the wall 4. At the opening in the casing wall 2 the peripheral speed is less and the pressure greater than at the opening in the casing wall 4, the oil being thus constantly pressed from wall 2 towards wall 4.

According to the structure illustrated in Figs. 4 and 5 the blades 33 are pivotally secured to the rim 3 by engaging the bolts 45 which are fixedly screwed to the casing with their claw-like naves 46. Strips 47 of felt or the like are provided in order to make a good joint between the chambers.

Between the casing wall 2 and the adjacent wall 48 of the drum there is left a free space 49 in which a set of rings 50 is revolving about the axis of the drum. These rings are mounted upon rollers 51 fitted upon pins 52 secured to the drum 48. The outside diameter of the rings is equal to that of the drum and each ring is provided with an eye 53 engaging with one of the blades 33 by means of a bolt 54 journalled within a boss 55 of the blades.

What I claim is:

1. A blower comprising a rotary casing mounted upon the crank shaft of an internal combustion engine and adapted to serve as a fly-wheel, a fixed drum eccentrically mounted within the said casing, blades adapted to oscillate arranged in the space between the drum and the casing, a hollow cylinder projecting from the said drum at its end adjacent the engine, an air inlet and an air outlet socket secured radially to the said projection, inlet openings, communicating with the outer atmosphere and an opening communicating with the inside of the crank case being provided in the inlet socket.

2. A blower comprising a rotary casing adapted to serve as a fly-wheel, a fixed drum eccentrically mounted within the said casing, a ring rotatably mounted upon the said drum and adapted to control the inlet and the outlet of the air, blades pivotally secured to the said ring and adapted to slide with their outer ends upon the inner perimeter of the casing and means for transmitting the rotary movement of the casing to the said ring.

3. A blower comprising a rotary casing adapted to serve as a fly-wheel, a fixed drum eccentrically mounted within the said casing, a ring rotatably mounted upon the drum and adapted to control the inlet and the outlet of the air, blades pivotally secured to the said ring and adapted to slide with their outer ends upon the inner perimeter of the casing, and means for transmitting the rotary movement of the casing to the said ring, so that the said ring and the said casing have the same angular velocity at all times.

4. A blower comprising a rotary casing adapted to serve as a fly-wheel, a fixed drum eccentrically mounted within the said casing, a ring rotatably mounted upon the drum and adapted to control the inlet and the outlet of the air, blades pivotally secured to the said ring and adapted to slide with their outer ends upon the inner perimeter of the casing, and a set of links pivoted in the casing and hingedly secured to the said ring, the said links being parallel and their length equal to the extent of the eccentricity between the said drum and the said casing.

5. A blower comprising a rotary casing adapted to serve as a fly-wheel, a fixed drum eccentrically mounted within the said casing, a ring rotatably mounted upon the drum and adapted to control the inlet and the outlet of the air, blades pivotally secured to the said ring and adapted to slide with their outer ends upon the inner perimeter of the casing, several circular rotary plates sunk into a side wall of the casing, a pin adapted to engage pivotally in the said ring and provided on each of these plates, the eccentricity of these pins with regard to the relative centers of the plates being parallel and equal to the eccentricity of the drum in regard to the casing.

6. A blower comprising a rotary casing adapted to serve as a fly-wheel, a fixed drum eccentrically arranged within the said casing, a set of ball bearings mounted in each side wall of the drum, a ring adapted to control the inlet and the outlet of the air rotatably mounted upon the drum by means of the said sets of ball bearings, blades pivotally secured to the said ring and adapted to slide with their outer ends upon the inner perimeter of the casing, and means for transmitting the rotary movement of the said casing to the said ring.

7. A blower comprising a rotary casing mounted upon the crank shaft of an internal combustion engine and adapted to serve as a fly-wheel, a fixed drum eccentrically arranged within the said casing, blades adapted to oscillate and arranged in the space between the said drum and the wall of the said casing, lubricating means arranged in the casing wall remote from the engine, oil conduits passing axially through the rim and opening into the inside of the casing, the openings in the casing wall remote from the engine being nearer to the axis than those in the casing wall adjacent the engine.

8. A blower comprising a rotary casing mounted upon a crank shaft of an internal combustion engine and adapted to serve as a fly wheel, a fixed drum eccentrically mounted within the said casing, blades adapted to oscillate arranged in the space between the drum and the casing, a hollow cylinder projecting from the said drum at its end adjacent the engine, an air inlet and an air outlet socket, both arranged at the side of the blower and radially mounted upon and rigidly connected to the said cylindrical projection and disposed at substantially right angles to the axis of rotation.

9. A blower as claimed in claim 8, wherein a set of separate rings is rotatably disposed between a casing wall and a wall of the drum, the axis of rotation of the said rings coinciding with the axis of the drum, and blades pivotally secured to the casing and to the said rings with their extremities respectively, different blades being connected to different rings.

10. A blower as claimed in claim 8, wherein a free space is provided between the casing wall and a wall of the drum, a set of pins projecting into the said free space, said pins being fixedly secured to the wall of the drum bordering the said space and disposed concentrically to the said drum, rollers loose on each of the said pins, a set of rings rotatably mounted upon the said rollers, and blades pivotally secured to the casing and to the said rings with their extremities respectively, different blades being connected to different rings.

In testimony whereof I affix my signature.

EUGEN MANDLER.